(12) United States Patent
Bin

(10) Patent No.: US 9,992,968 B2
(45) Date of Patent: Jun. 12, 2018

(54) SLIDING DOOR FOR A METAL WIRED PET CAGE

(71) Applicant: Jiangsu Zhongheng Pet Articles Joint-Stock Co., Ltd., Jiangsu (CN)

(72) Inventor: Qiu Bin, Jiangsu (CN)

(73) Assignee: Jiangsu Zhongheng Pet Articles Joint-Stock Co., Ltd., Yancheng, Jiangsu (CN)

( * ) Notice: Subject to any disclaimer, the term of this patent is extended or adjusted under 35 U.S.C. 154(b) by 0 days. days.

(21) Appl. No.: 15/197,960

(22) Filed: Jun. 30, 2016

(65) Prior Publication Data

US 2017/0000080 A1 Jan. 5, 2017

(30) Foreign Application Priority Data

Jun. 30, 2015 (CN) .................... 2015 2 0461838 U

(51) Int. Cl.
*A01K 1/03* (2006.01)
*A01K 1/02* (2006.01)
*A01K 31/02* (2006.01)
*A01K 31/06* (2006.01)
*E05C 3/02* (2006.01)
*E05B 15/16* (2006.01)

(52) U.S. Cl.
CPC .............. *A01K 1/03* (2013.01); *A01K 1/0245* (2013.01); *A01K 31/02* (2013.01); *A01K 31/06* (2013.01); *E05C 3/02* (2013.01); *E05B 2015/1692* (2013.01)

(58) Field of Classification Search
CPC .............. E05C 3/02; E05B 2015/1692; Y10T 16/53888
See application file for complete search history.

(56) References Cited

U.S. PATENT DOCUMENTS

| 5,373,810 | A | * | 12/1994 | Martin | .................... A01K 31/10 119/459 |
| 9,695,636 | B2 | * | 7/2017 | Cantwell | ............... E06B 11/021 |
| 2006/0266298 | A1 | * | 11/2006 | Tsai | .......................... A01K 1/03 119/481 |
| 2011/0175374 | A1 | * | 7/2011 | Hertrich | ............. E05B 65/0014 292/195 |
| 2012/0186530 | A1 | * | 7/2012 | Cantwell | ............. A01K 1/0245 119/474 |

(Continued)

*Primary Examiner* — Katherine W Mitchell
*Assistant Examiner* — Marcus Menezes
(74) *Attorney, Agent, or Firm* — Liang Legal Group, PLLC

(57) ABSTRACT

A sliding door for a metal wired pet cage includes a pair of torsional springs; a rotary locking member; a rotary lifting handle; and a sliding-type door plate; wherein sliding guide rails of the sliding door are configured longitudinally, wherein the lifting handle is hingedly fixed to an upper end of the sliding-type door plate, the pair of torsional springs are fixed on the metal wired pet cage and are connected with both ends of the locking member, and the torsional springs is configured to drive the locking member to prop against the lifting handle so that the sliding-type door plate is at a locking state. When the sliding type door plate needs to be opened, the lifting handle is rotated upwards so that the locking member is separated from the lifting handle, and the lifting handle drives the sliding-type door plate to move upwards along the sliding guide rails.

5 Claims, 7 Drawing Sheets

(56) References Cited

U.S. PATENT DOCUMENTS

| | | | |
|---|---|---|---|
| 2016/0138322 A1* | 5/2016 | Link | A01K 1/034 49/394 |
| 2017/0055486 A1* | 3/2017 | Bin | A01K 1/0245 |
| 2017/0142927 A1* | 5/2017 | Cantwell | A01K 1/03 |

* cited by examiner

SLIDING DOOR FOR A METAL WIRED PET CAGE

CROSS-REFERENCE TO RELATED APPLICATIONS

This Application claims the priority of Chinese Patent Application No. 201520461838, filed on Jun. 30, 2015, the disclosure of which is incorporated by reference in its entirety.

TECHNICAL FIELD

The present invention relates to a pet cage, in particular to a sliding door for a metal wired pet cage, belonging to the technical field of pet cages.

BACKGROUND ART

In the existing metal wired mesh cages for keeping pets, a door capable of being opened and closed is disposed on one side of a cage, and the door is generally of a rotating type or a sliding type. Whether it is a rotating type or a sliding type, the door is generally locked via a bolt. During use, the bolt is capable of being moved left and right, or up and down, in manual operations. Such bolts are inconvenient to operate and are relatively laborious to operate especially when the metal wired mesh cage is rusted or insufficiently lubricated. In addition, as an independent part, the bolt is not integrated with the whole pet cage and may be separated from the bolt-insertion hole occasionally, causing unnecessary trouble to the users.

SUMMARY OF THE INVENTION

A technical problem to be solved by embodiments of the present invention is that: the existing sliding door of the metal wired cage is inconvenient to operate, and is relatively laborious to operate especially in case that the metal wired mesh cage is rusted or insufficient lubricated. Moreover, the bolt may occasionally separate from the bolt-insertion hole, resulting in unnecessary troubles to users.

Embodiments of the present invention may adopt the following technical solutions:

In accordance with embodiments of the invention, a siding door for an metal wired pet cage may comprise a pair of torsional springs 1, a rotary locking member 2, a rotary lifting handle 3, and a sliding-type door plate 6. Sliding guide rails of the sliding door may be configured longitudinally.

The lifting handle 3 is hinged and fixed to the upper end of the sliding-type door plate 6. A pair of torsional springs 1 are fixed on the pet cage and are connected with both ends of the locking member 3. The torsional springs 1 is configured to drive the locking member 2 to prop against the lifting handle 3 so that the sliding-type door plate 6 is at a locking state. When the sliding-type door plate 6 needs to be opened, the lifting handle 3 is rotated upwards so that the locking member 2 is separated from the lifting handle 3, and the lifting handle 3 drives the sliding-type door plate 6 to move upwards along the sliding guide rails.

In accordance with embodiments of the invention, an articulation part 3*a* between the lifting handle 3 and the sliding-type door plate 6 may be of a circular arc shape and may prop against the locking member 2.

In accordance with embodiments of the invention, the sliding guide rails may be circular guide rails 5.

In accordance with embodiments of the invention, the sliding guide rails may be square guide rails 4.

In accordance with embodiments of the invention, the surface of a part where the locking member 2 is in contact with the lifting handle 3 may be of a circular arc shape.

Embodiments of the present invention may have one or more of the following characteristics:
1) the sliding door is capable of realizing automatic unlocking and very easy (labor-saving) to operate.
2) The actions of unlocking and opening the door of the pet cage may be continuous (coherent) and very convenient to operate.
3) No bolt needs to be used, so that there are fewer parts and the phenomenon of lost parts can be minimized.
4) The sliding door is ingenious in design.
5) The articulation part between the lifting handle and the sliding-type door plate is of a circular arc, and the circular arc part props against the locking member, so that the resistance is reduced and the operations are more convenient and labor-saving (easier).

Figure 1:
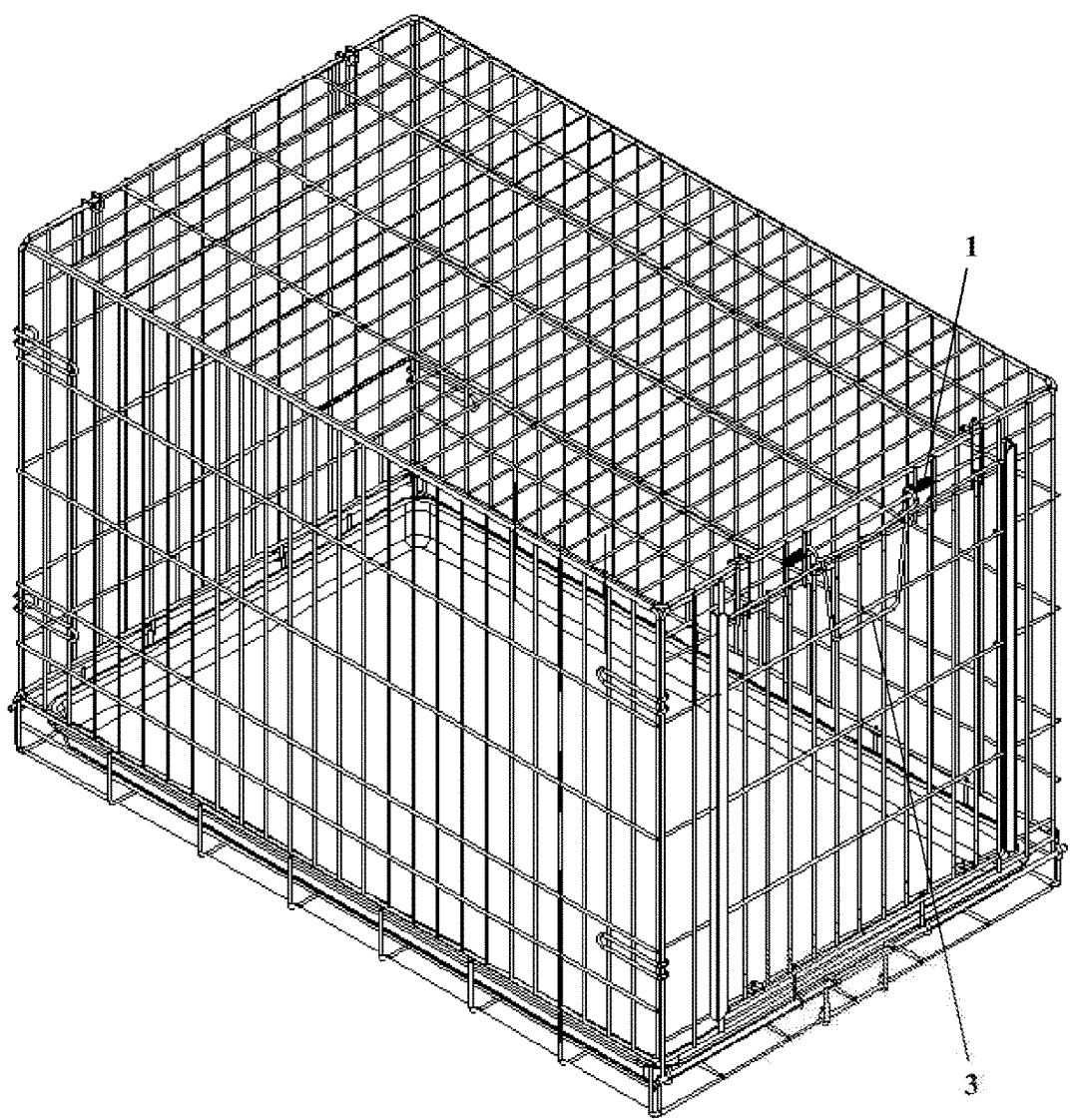
FIG. 1 shows a perspective view of an embodiment of the invention when the sliding door for the metal wired pet cage is at a closed state.
Figure 2:
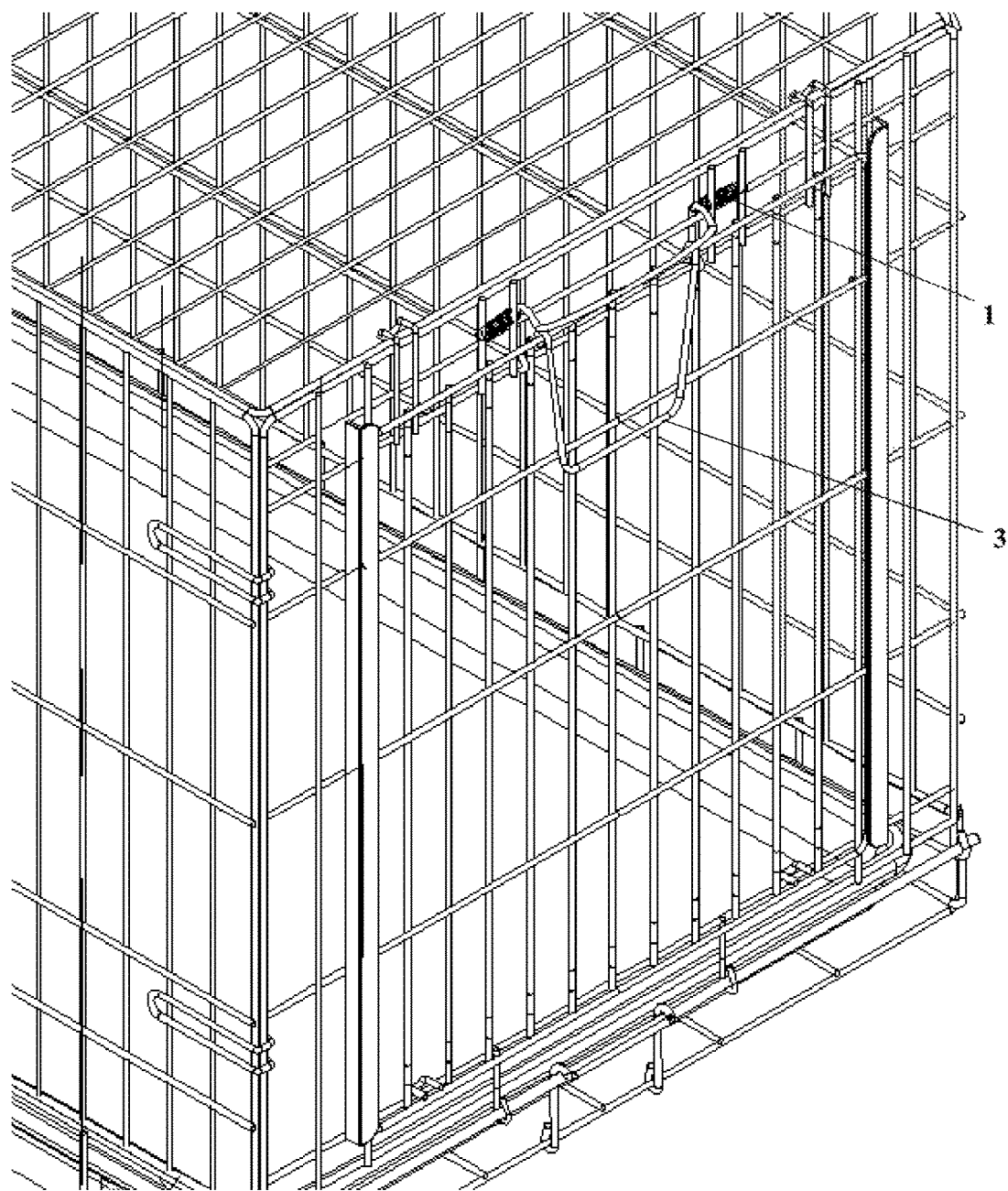
FIG. 2 shows a partial enlarged view of the embodiment shown in FIG. 1.

In FIGs., the references are as follows: the torsional springs 1, the locking member 2, the lifting handle 3, the square guide rails 4, the circular guide rails 5, the sliding type door plate 6, and the articulation part 3*a* between the lifting handle and the sliding type door plate are marked.

DETAILED DESCRIPTIONS OF THE PREFERRED EMBODIMENTS

With reference to FIG. 1 to FIG. 7, in accordance with embodiments of the invention, a siding door for an metal wired pet cage may comprise a pair of torsional springs 1, a rotary locking member 2, a rotary lifting handle 3, and a sliding-type door plate 6. Sliding guide rails of the sliding door may be configured longitudinally. The lifting handle 3 is hinged and fixed to the upper end of the sliding-type door plate 6. A pair of torsional springs 1 are fixed on the pet cage and are connected with both ends of the locking member 2. The torsional springs 1 is configured to drive the locking member 2 to prop against the lifting handle 3 so that the sliding-type door plate 6 is at a locking state. When the sliding-type door plate 6 needs to be opened, the lifting handle 3 is rotated upwards so that the locking member 2 is separated from the lifting handle 3, and the lifting handle 3 drives the sliding type door plate 6 to move upwards along the sliding guide rails.

Figure 4:
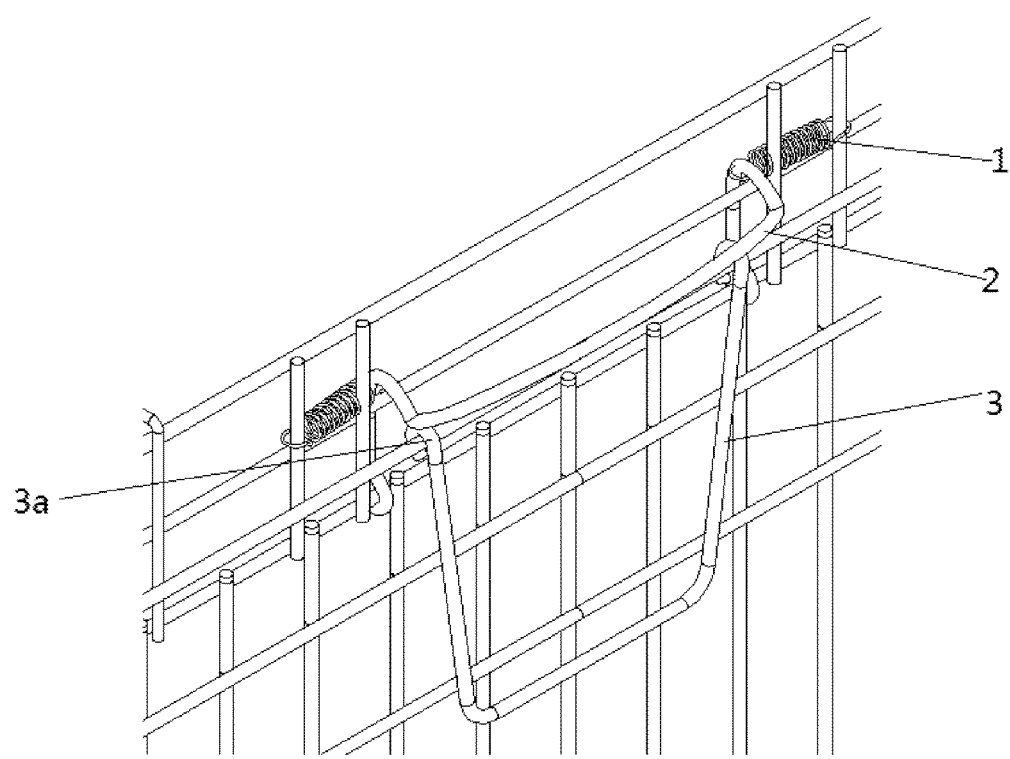
FIG. 4 shows a partial enlarged view of the embodiment shown in FIG. 3.
Figure 5:
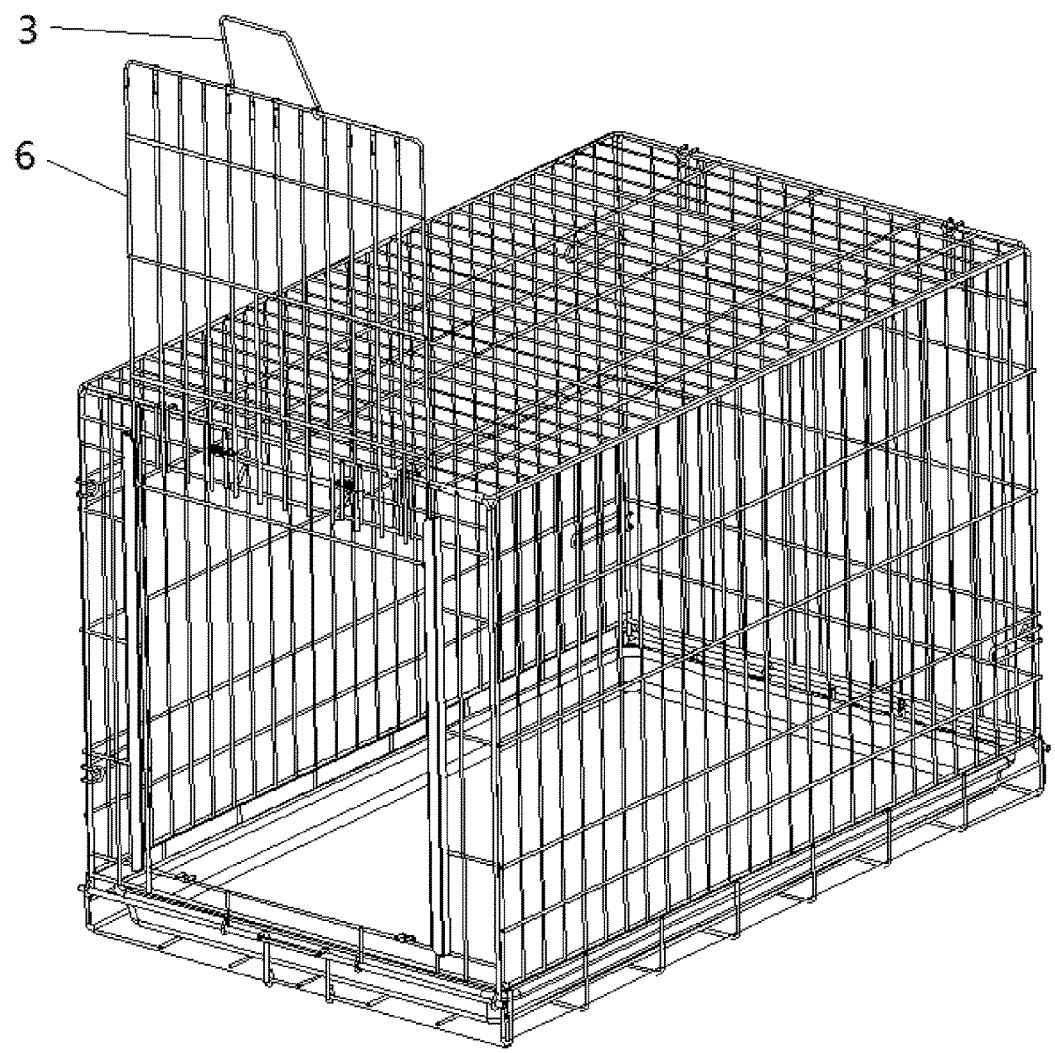
FIG. 5 shows a perspective view of an embodiment of the invention when the sliding door for the metal wired pet cage is at an opened state.
Figure 6:
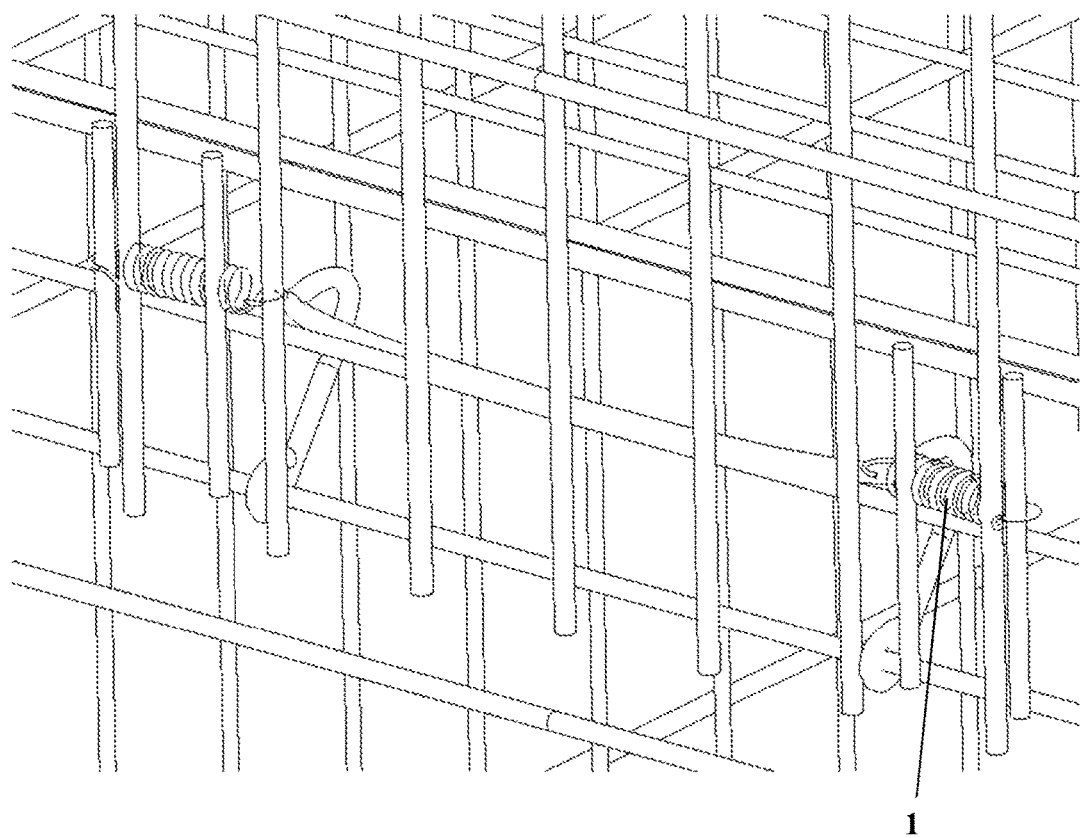
FIG. 6 shows a partial enlarged view of the embodiment shown in FIG. 5.

Referring to FIG. 4, in accordance with embodiments of the invention, an articulation part 3a between the lifting handle 3 and the sliding-type door plate 6 may be of a circular arc shape and may prop against the locking member 2.

Figure 7:
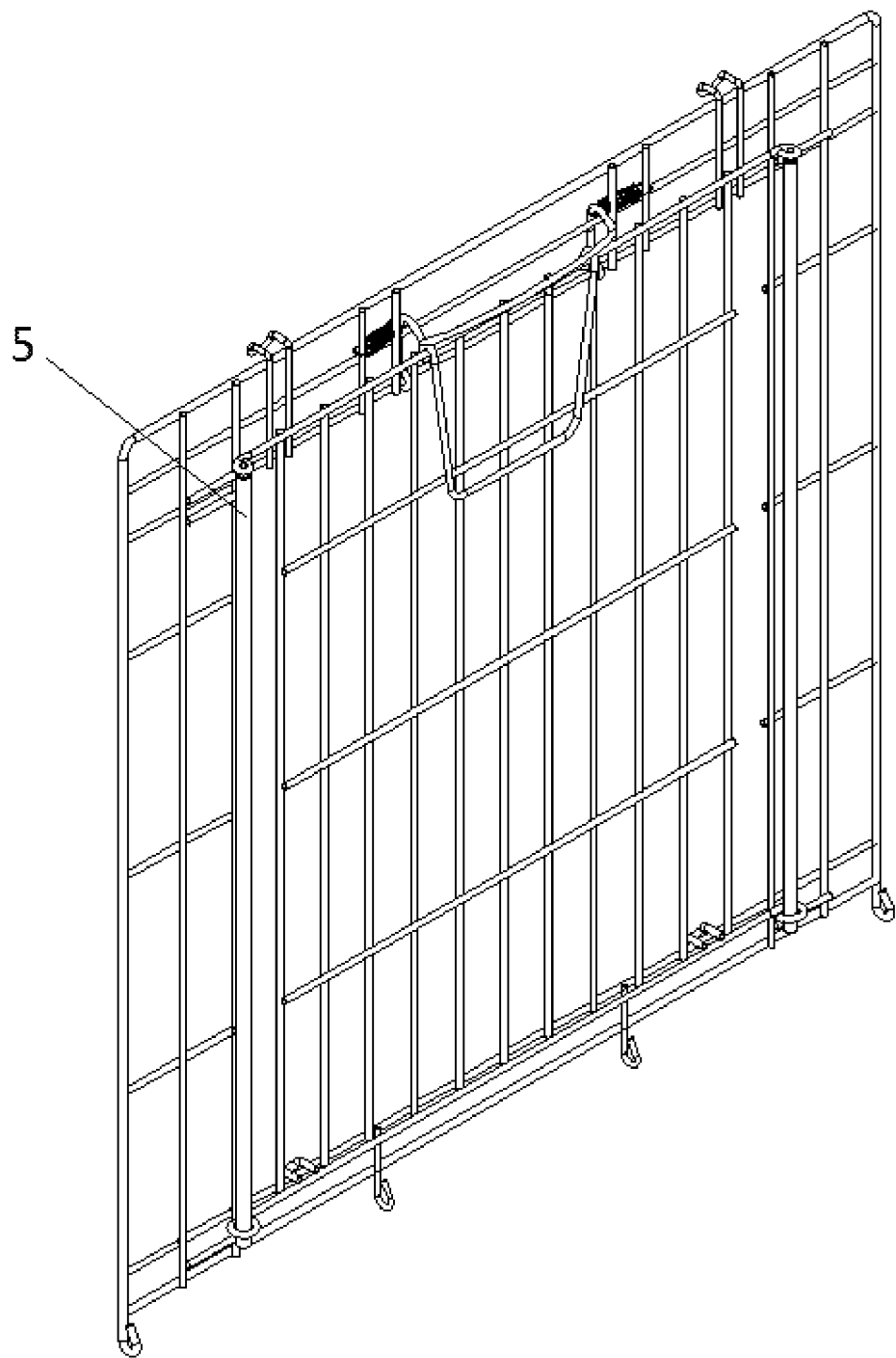
FIG. 7 shows a schematic illustrating a sliding type door plate part of a circular guide rail form in accordance with one embodiment of the invention.

Referring to FIG. 7, in accordance with embodiments of the invention, the sliding guide rails may be cylindrical guide rails 5, with a circular cross section.

Figure 3:
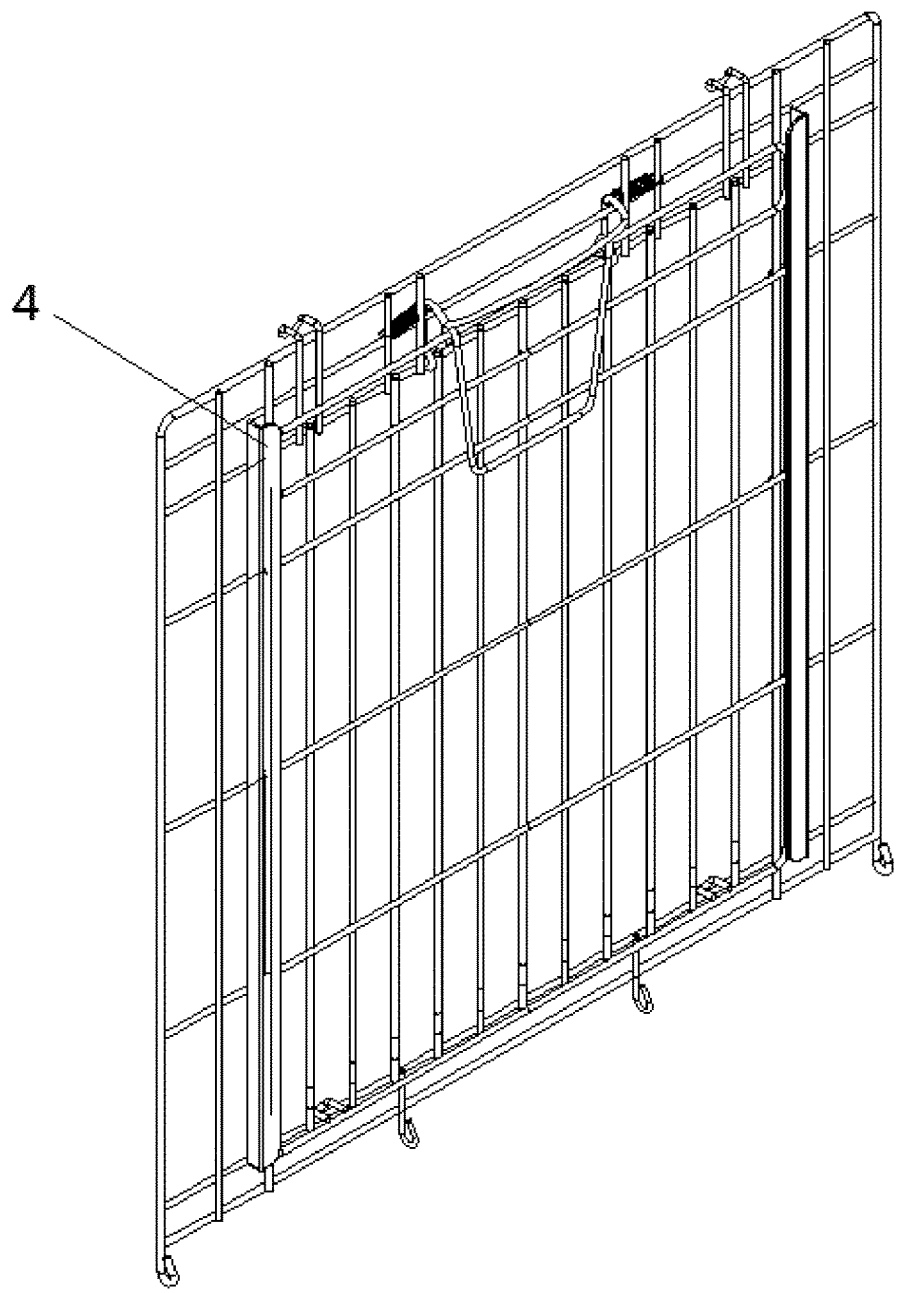
FIG. 3 shows a schematic illustrating a sliding-type door plate part of a square guide rail type in accordance with one embodiment of the invention.

Referring to FIG. 3, in accordance with embodiments of the invention, the sliding guide rails may be square guide rails 4, with a square or rectangular cross section.

Referring to FIG. 4, in accordance with embodiments of the invention, the surface of a part where the locking member 2 is in contact with the lifting handle 3 may be of a circular arc.

According to embodiments of the present invention, a sliding door for a metal wired pet cage may be capable of realizing automatic unlocking and very easy (labor-saving or effortless) to operate. Actions of unlocking and opening the door of a pet cage are continuous/coherent and are very convenient to operate. No bolt is used so that parts of the bolt are eliminated and the phenomenon of lost parts cannot happen. The sliding door is ingenious in design, and the articulation between the lifting handle and the sliding-type door plate is of a circular arc. The circular arc part props against the locking member so that the resistance is reduced, and the operations are more convenient and easier (labor-saving).

What is claimed is:

1. A sliding door for a metal wired pet cage, comprising:
   a pair of torsional springs;
   a rotary locking member;
   a rotary lifting handle; and
   a sliding door plate;
   wherein sliding guide rails of the sliding door are configured longitudinally,
   wherein the rotary lifting handle is hingedly fixed to an upper end of the sliding door plate,
   wherein the pair of torsional springs are fixed on the metal wired pet cage and are connected with two ends of the rotary locking member, and
   wherein the pair of torsional springs are configured to drive the rotary locking member to prop against the rotary lifting handle so that the sliding plate is at a locking state, and
   when the sliding door plate needs to be opened, the rotary lifting handle is rotated upwards so that the rotary locking member is separated from the rotary lifting handle while the rotary lifting handle drives the sliding door plate to move upwards along the sliding guide rails.

2. The sliding door for the metal wired pet cage according to claim 1, wherein an articulation part between the rotary lifting handle and the sliding-type door plate is of a circular arc shape and props against the rotary locking member.

3. The sliding door for the metal wired pet cage according to claim 1, wherein the sliding guide rails are circular guide rails.

4. The sliding door for the metal wired pet cage according to claim 1, wherein the sliding guide rails are square guide rails.

5. The sliding door for the metal wired pet cage according to claim 1, wherein a surface of a part where the rotary locking member is in contact with the rotary lifting handle is of a circular arc shape.

* * * * *